United States Patent

Date et al.

[11] Patent Number: 5,094,114
[45] Date of Patent: Mar. 10, 1992

[54] APPARATUS FOR CONTROLLING RAPID FEED SPEED OF MOVABLE BODIES

[75] Inventors: Takao Date; Isao Wakamiya, both of Shizuoka, Japan

[73] Assignee: Toshiba Kikai Kabushiki Kaisha, Tokyo, Japan

[21] Appl. No.: 607,306

[22] Filed: Oct. 31, 1990

[30] Foreign Application Priority Data

Nov. 2, 1989 [JP] Japan .................... 1-286559

[51] Int. Cl.$^5$ ............................... F16H 25/20
[52] U.S. Cl. .................... 74/89.15; 192/141; 192/146
[58] Field of Search ............ 74/89.15, 424.8 R; 192/141, 146

[56] References Cited

U.S. PATENT DOCUMENTS

| | | | |
|---|---|---|---|
| 1,590,570 | 6/1926 | Flack et al. | 74/89.15 |
| 4,666,026 | 5/1987 | Poulin | 74/89.15 X |
| 4,715,580 | 12/1987 | Mueller | 74/89.15 X |
| 4,893,704 | 1/1990 | Fry et al. | 74/89.15 X |
| 4,929,165 | 5/1990 | Inaba et al. | 74/89.15 X |

*Primary Examiner*—Allan D. Herrmann
*Attorney, Agent, or Firm*—Koda and Androlia

[57] ABSTRACT

In apparatus for controlling a rapid feed speed of a movable body, for example a table of a machine tool, by using a ball screw, there are provided a converting device for converting the rotation of the ball screw into a force for reciprocating the table, a position detector which judges whether a nut of the ball screw is at an end of the movement of the nut or at a central portion of the movement for issuing a detection signal and a speed reducing device which reduces the number of revolutions of the ball screw when the detection signal is issued.

1 Claim, 1 Drawing Sheet

APPARATUS FOR CONTROLLING RAPID FEED SPEED OF MOVABLE BODIES

BACKGROUND OF THE INVENTION

This invention relates to apparatus for controlling a rapid feed speed of a movable member, for example, a table, saddle or the like of a machine tool.

Although a ball screw has been widely used for moving a movable body of a machine tool and various machines, in recent years, a high speed operation of a machine has been developed for the purpose of increasing productivity. Usually, a ball screw is constructed such that it is supported on a machine bed or the like by supporting both ends of the ball screw through bearings, that one end of the ball screw is connected to a source of drive, and that a nut mating with an intermediate portion a threaded rod of the ball screw is connected to the movable body so as to transform the rotation of the source of drive into a linear motion of the movable body. As a consequence where the distance of movement of the movable body, that is, the table is large, for example larger than 6 m, the maximum number of revolutions is limited by a dangerous speed resonating with the natural or inherent number of vibrations of the ball screw. For this reason, for the purpose of preventing deflection of the ball screw, according to a prior art construction, a bracket is provided at an intermediate position of the ball screw, which is retracted from the ball screw when the nut approaches the bracket and advanced toward the ball screw when the nut has passed through the bracket, thus pressing the bracket against the ball screw for preventing its deflection. However, this construction is complicated and friction is created between the bracket and the periphery of the ball screw. Moreover, where the retraction motion is not adequate or a misoperation occurs, the machine would be damaged.

To eliminate these problems, as has been disclosed in Japanese Laid Open Utility Model Specification No. 27352/1984 a deflection preventing device has been proposed wherein a pair of brackets interconnected by a rod are slidably mounted on a bed so as to clamp the nut of the ball screw. Although this construction is effective it is necessary to provide two brackets, rods interconnecting them and guide planes for guiding the brackets.

SUMMARY OF THE INVENTION

It is an object of this invention to provide improved apparatus for controlling the rapid feed speed of a movable body with a simple construction.

Another object of this invention is to provide an improved apparatus for controlling the rapid feed speed of a movable body capable of effecting a high speed feeding in an ordinary range of movement without using complicated mechanism.

According to this invention there is provided apparatus for controlling a rapid feed speed of a movable body comprising means for converting rotation of a ball screw including a threaded shaft into a force for reciprocating the movable body; a nut mating with the threaded shaft; position detecting means which judges as to whether the position of the nut is at the end of a movement of the nut or at the central portion of the movement for issuing a detection signal; means for judging presence or absence of the detection signal; and means for reducing the number of revolutions of the threaded shaft of the ball screw when the detection signal is issued.

DESCRIPTION OF THE PREFERRED EMBODIMENT

Figure 1:
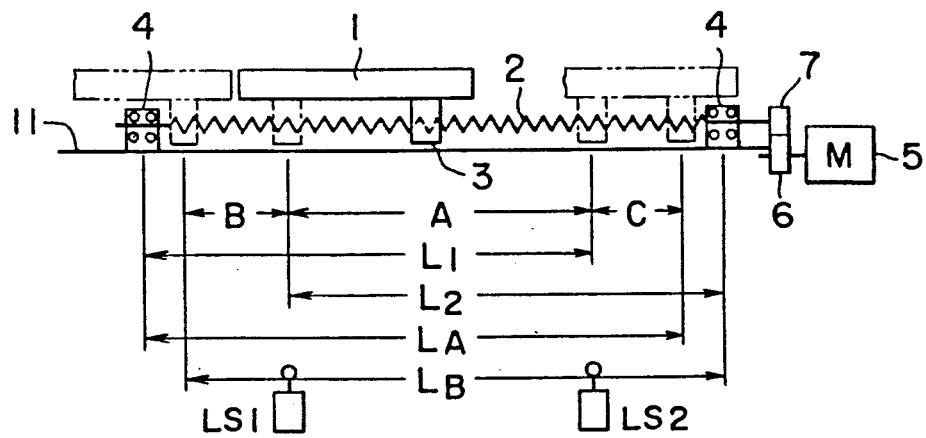
FIG. 1 is a diagrammatic representation showing a movable body, a ball screw and the distance of movement of the movable body.
Figure 2:
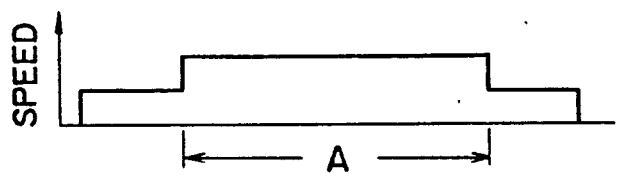
FIG. 2 is a graph showing the variation of the rapid feed speed.
Figure 3:
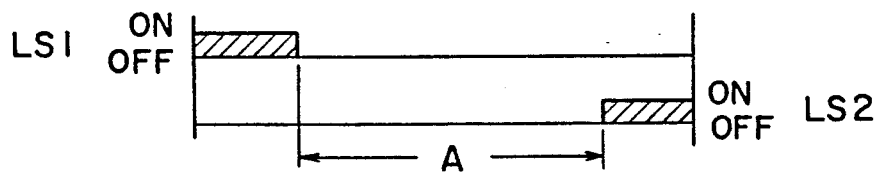
FIG. 3 is a graph showing the ON-OFF states of a position detector.
Figure 4:
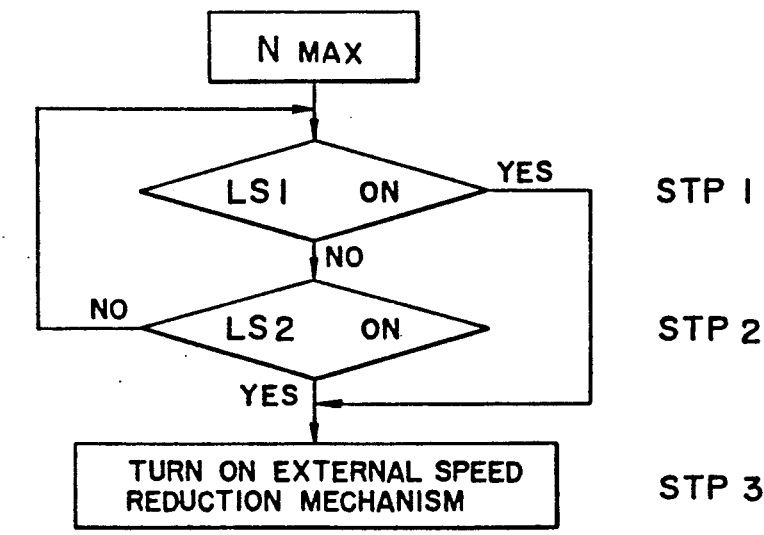
FIG. 4 is a flow chart for explaining the operation of the control apparatus of this invention.

In FIG. 1, a table of a machine tool is shown as an example of a movable body.

A table 1 is mounted on a bed 11 to be reciprocatable. The rotation of an electric motor is transmitted to a ball screw 2 through gears 6 and 7. The rotation of the ball screw is converted into a rectilinear motion by a nut 3 secured to the lower side of table 1 for mating with ball screw 2 so as to reciprocate the table 1. The opposite ends of ball screw 2 are supported by bed 11 through bearings 4 in the form of a double anchor type. The nut 3 takes the form of a double nut and is imparted with a preload by the engagement with the ball screw 2. Limit switches LS1 and LS2 are secured to bed 11 to cooperate with a dog, not shown, secured to table 1. When nut 3 is at a central position, that is within a length A shown in FIG. 1, limit switches LS1 and LS2 would not be operated, whereas when nut 3 is at one end of its movement, that is at position B or C, either one of the limit switches LS1 and LS2 would be operated.

The feed speed of the movable body, that is table 1 in the illustrated embodiment, can be determined by providing an absolute scale for a stationary member, for example the bed, digitally measuring the position of the absolute scale for determining the maximum span L, and then judging as to whether the ball screw is operated at the maximum speed or not.

The operation of this invention will now be described with reference to the accompanying drawing. The permissible number of revolutions N of the ball screw is generally expressed by the following equation.

$$N = \alpha \cdot 60\lambda^2 / 2\pi L^2 \times (EIg/\gamma A)^{\frac{1}{2}}$$

where
$\alpha$: safety factor (usually 0.8)
$\lambda$: constant determined by the method of mounting the ball screw
$L$: maximum span (larger one of $L_A$ and $L_B$ shown in FIG. 1)
$E$: Young's modulus
$I$: minimum secondary moment of the cross-section of a threaded shaft
$g$: acceleration by gravity
$\gamma$: specific weight
$A$: cross-sectional area of threaded shaft In the case of the double anchor type, the distance between the mounting devices of a prior ball screw has been deemed as the distance $L_A$ or $L_B$ (see FIG. 1) between the middle point of both bearings and the center of the nut at the position of the maximum movement of the table, and the calculation was made by taking the larger one of $L_A$ and $L_B$ as the maximum span L. In contrast, according to this invention, a range in which the movable member of a machine moves normally is considered as the range of movement A, and the permissible number of revolutions $N_{MAX}$ is calculated by substituting either one of a longer distances $L_1$ and $L_2$ which represent the distance between the ball screw bearing and the center of the nut in a range of the normal movement, for the maximum span L between the mounting devices. As can be noted from the equation shown hereinabove, since the permissible number of revolutions is inversely proportional to the square of the distance between the mounting devices, by denoting the maximum span L between the mounting devices by $L_1$ or $L_2$, the permissible number of revolutions can be increased greatly, which permits high speed rotations.

Referring now to FIG. 1, when an instruction regarding the permissible number of revolutions $N_{MAX}$ is issued, at step STP1, a judgment is made as to whether the limit switch LS1 is ON or OFF. When the limit switch LS1 is OFF, the program is transferred to step STP2, whereas when the limit switch is ON, the program is transferred to step STP3. At step STP2, a judgment is made as to whether limit switch LS2 is ON or OFF. When the limit switch LS2 is OFF, the program is returned back to step STP1 so as to operate the machine while maintaining the condition of $N_{MAX}$, whereas when the limit switch LS2 is ON the program is transferred to step STP3 to turn ON an external speed reduction mechanism for reducing the number of revolutions of the ball screw shaft to a speed lower than a dangerous speed.

According to the control apparatus of this invention it is possible to control the speed of the movable member at an optimum speed by judging whether it is possible to move the movable member at the maximum speed or not merely by detecting the fact that the movable member is at a predetermined position without using any special apparatus.

What is claimed is:

1. Apparatus for controlling a rapid feed speed of a movable body comprising:

means for converting rotation of a ball screw including a threaded shaft into a force for reciprocating said movable body;

a nut mating with said threaded shaft;

position detecting means which judges as to whether a position of said nut is at an end of a movement of said nut or at a central portion of said movement for issuing a detection signal;

means for judging presence or absence of said detection signal;

means for reading a number of revolutions of said threaded shaft of said ball screw when said detection signal is issued; and wherein a permissible number of revolutions N of said ball screw is expressed by an equation $$N = \frac{a60\lambda^2}{2\pi L^2} \times \left(\frac{EIg}{\gamma A}\right)^{\frac{1}{2}}$$

where
a:safety factor;
$\lambda$:constant determined by a method of mounting said ball screw;
L:maximum span;
E:Young'modulus;
I:minimum secondary moment of a cross-section of a threaded shaft;
g:acceleration by gravity;
$\gamma$:specific weight; A:cross-sectional area of said threaded shaft.

* * * * *